Figure 1:
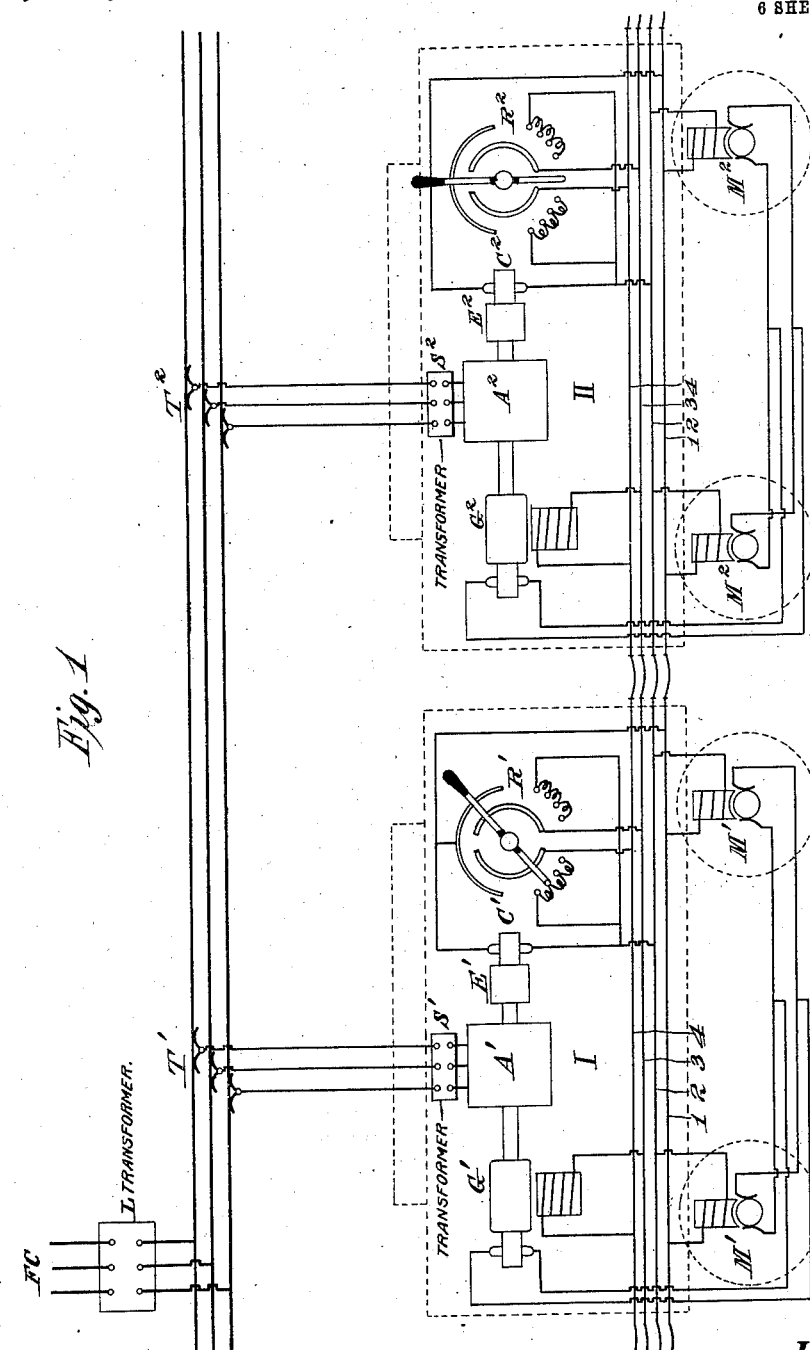

H. W. LEONARD.
METHOD OF MULTIPLE CONTROL.
APPLICATION FILED MAY 9, 1901.

1,003,923.

Patented Sept. 19, 1911.

6 SHEETS—SHEET 1.

Witnesses:
Jas. F. Coleman
Jno. R. Taylor

Inventor
H Ward Leonard
by Dyer Edmonds & Dyer
Att'ys.

H. W. LEONARD.
METHOD OF MULTIPLE CONTROL.
APPLICATION FILED MAY 9, 1901.
1,003,923.
Patented Sept. 19, 1911.
6 SHEETS—SHEET 2.
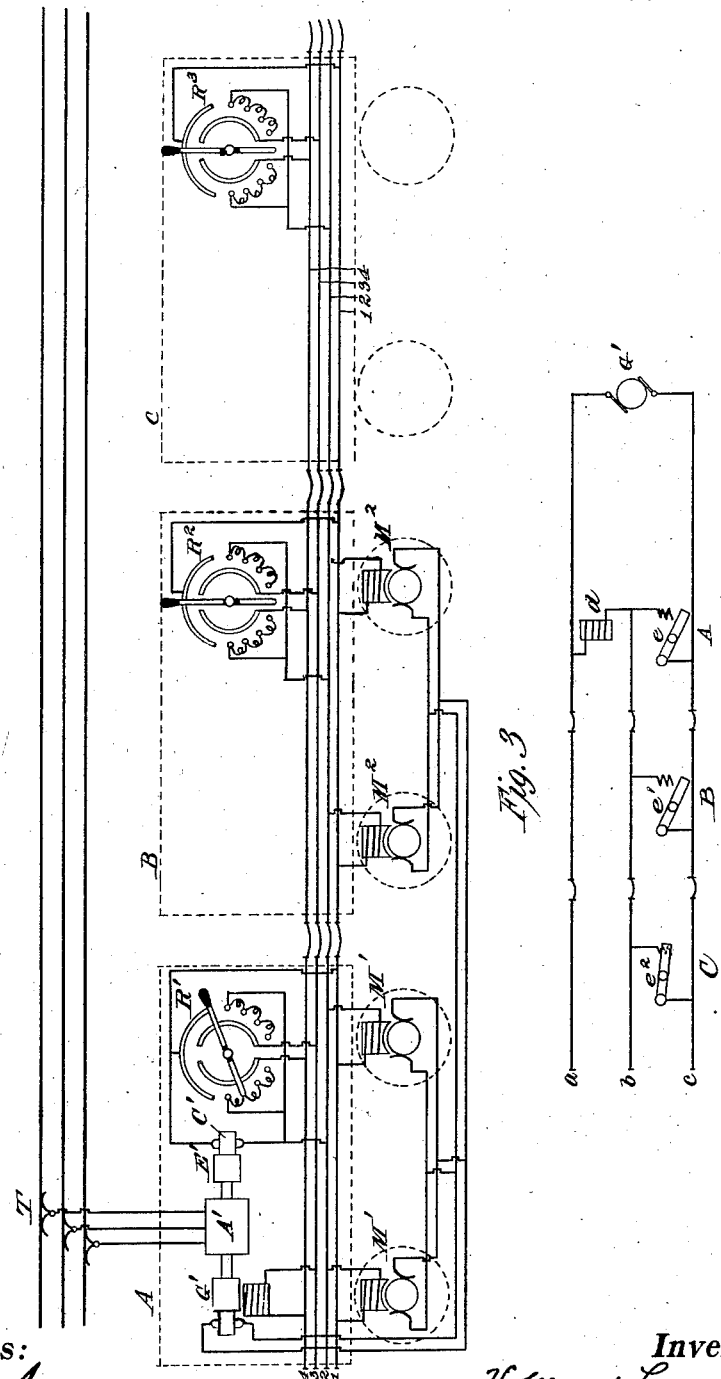
Witnesses:
Jas. F. Coleman
Jno. R. Taylor
Inventor
H Ward Leonard
by Dyer Edmonds & Dyer
Att'ys.

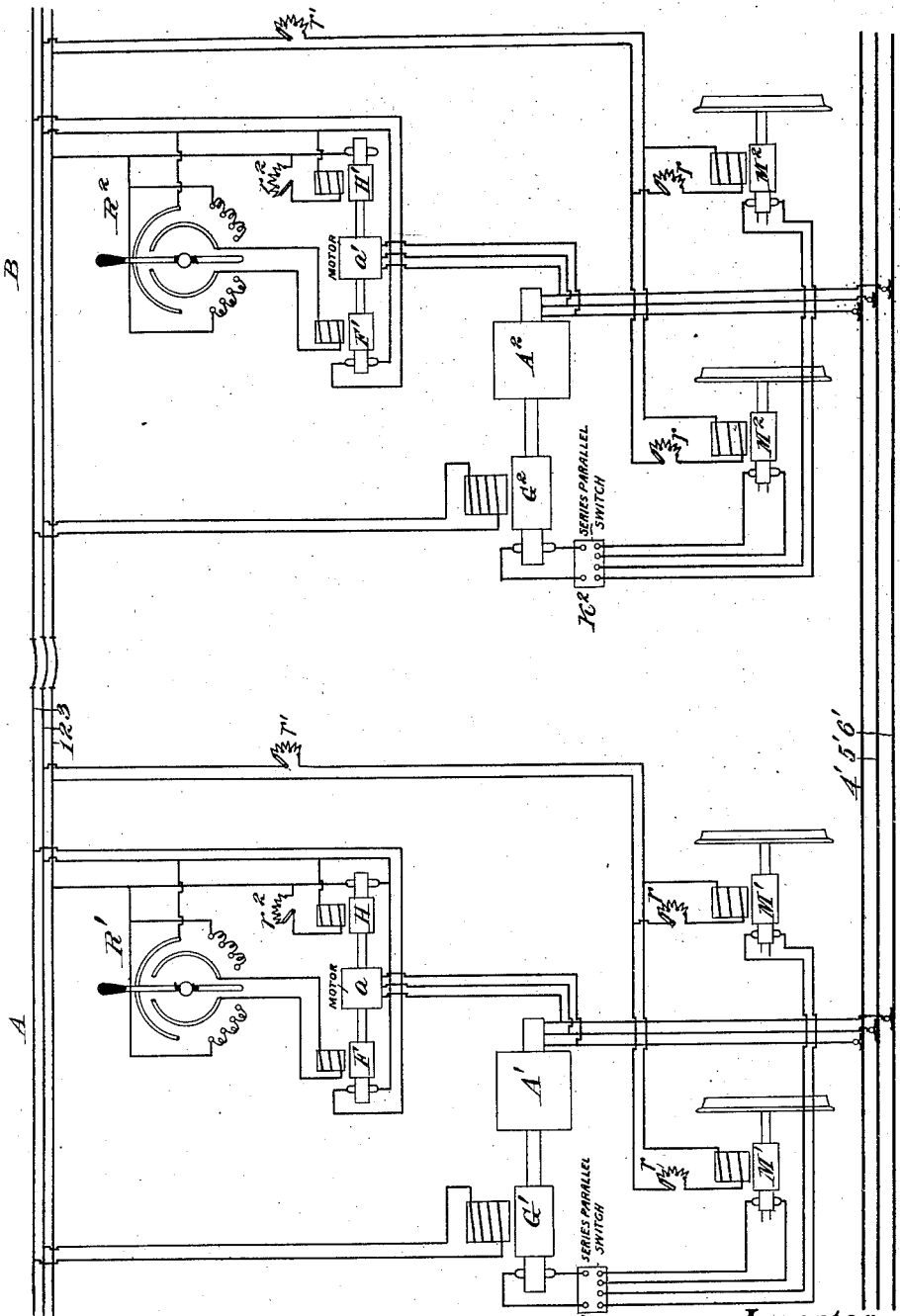

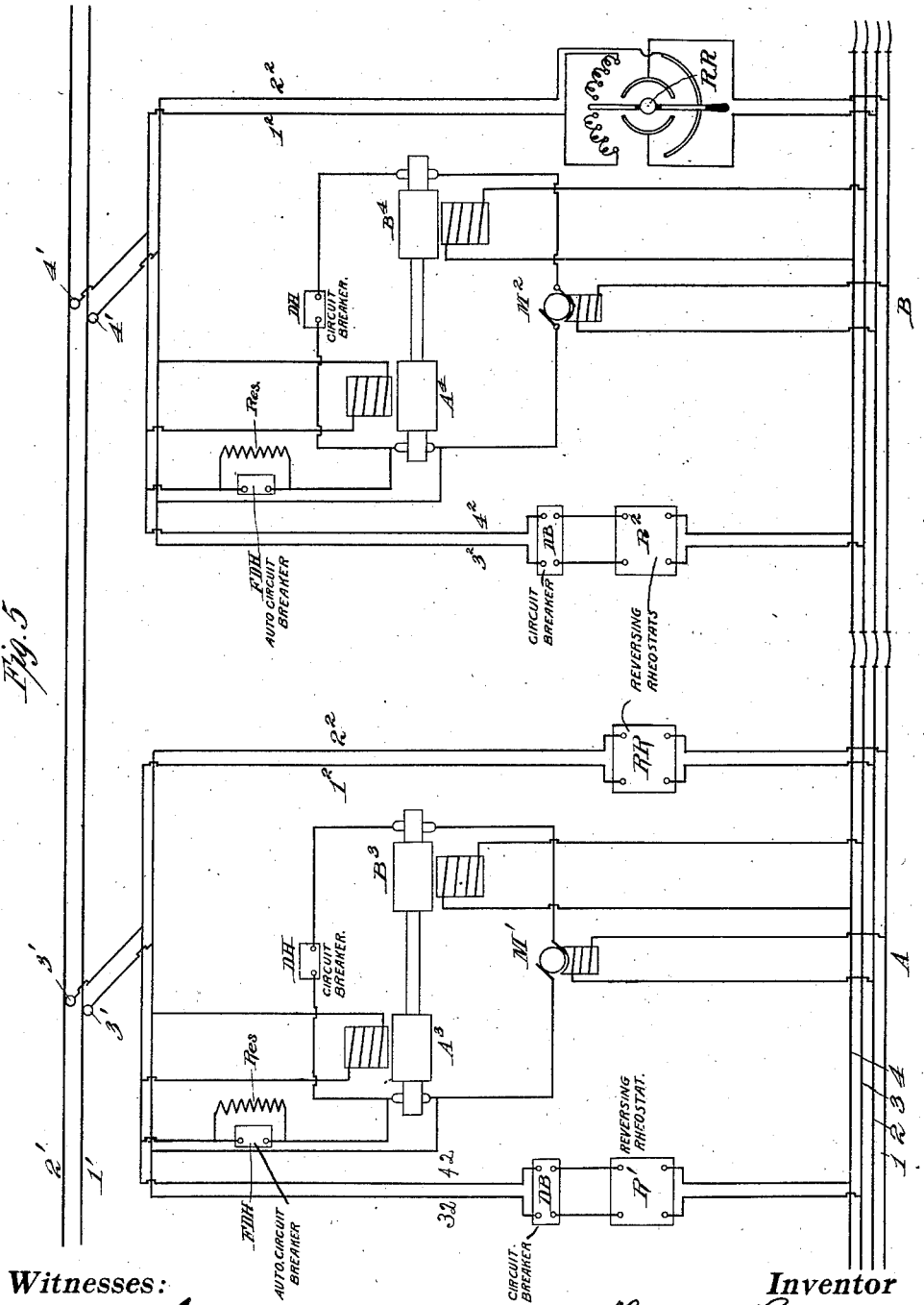

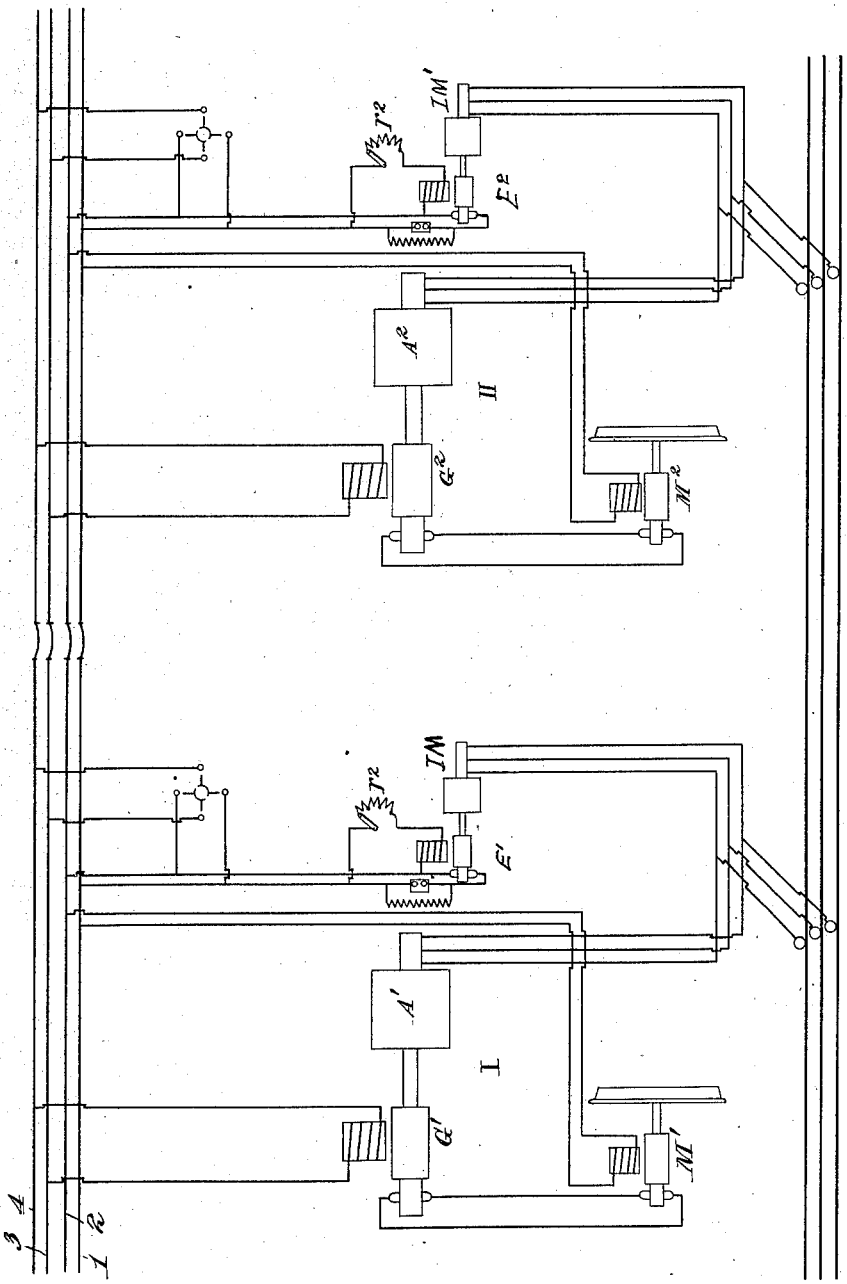

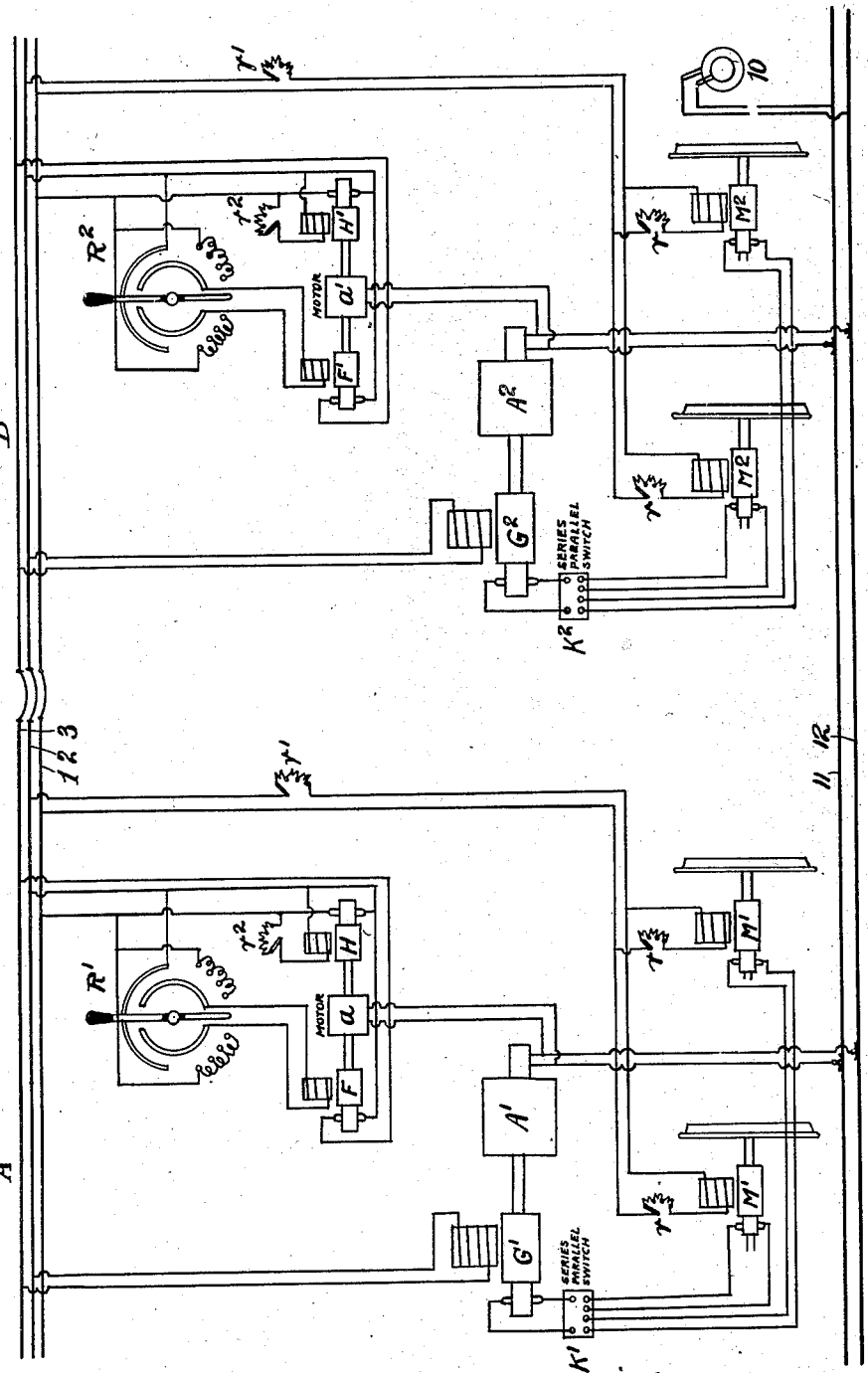

UNITED STATES PATENT OFFICE.

HARRY WARD LEONARD, OF NEW YORK, N. Y.

METHOD OF MULTIPLE CONTROL.

1,003,923.  Specification of Letters Patent.  Patented Sept. 19, 1911.

Original application filed January 24, 1901, Serial No. 44,565. Divided and this application filed May 9, 1901. Serial No. 59,373.

*To all whom it may concern:*

Be it known that I, HARRY WARD LEONARD, a citizen of the United States, residing in the borough of Manhattan, city of New York, State of New York, have invented a certain new and useful Improved Method of Multiple Control, of which the following is a description.

My invention relates to electric transmission of power, and my principal object is the operation of electric translating devices in such a way that one or more of such devices can be controlled from several different points.

The present application is a division of my application filed January 24th 1901, Serial No. 44,565.

One of the most important applications of my present invention is the simultaneous control of a plurality of electric motors located upon different cars composing a train, so that from any one of several different cars the motors can be operated at any desired speed and in either direction, while at the same time they will operate in harmony, dividing the load approximately in proportion to their capacity. My invention is also capable of use in the operation of electric motors used for other purposes, as for example in connection with pumps, swinging bridges, elevators, cranes, guns, propellers, rudders, metal rolls, moving sidewalks, printing presses, cable power transmitting devices, as well as valves and governors of engines, turbines, etc. My invention is, however, not limited to the control of electric motors, but may be utilized in controlling the voltage or the current supplied to other electric translating devices, such as electric lights, electric heaters, rheostats, circuit controllers, electric furnaces, storage batteries, electrolytic cells, and in fact mechanism in general operated or controlled from several points through the agency of electric energy.

My invention is of particular importance with reference to the control of motors of the commutator type and with regard to the advantages secured of a smoothly graduated control of the speed which are not so advantageously obtainable with motors of other types. In motors of the commutator type, however, there are difficulties with regard to the commutation due to flashing over, insulation, destructive sparking, etc., unless the electromotive force of the energy to be commutated is kept below certain limits dependent upon the design of the motor. It is, therefore, very desirable in conjunction with transmitting and collecting energy at high pressures, to transform such high pressure energy upon the train (when my invention is used in connection with railways,) to energy of sufficiently low electromotive force so that the objections to commutation may be avoided and secure the said advantages as to refined, gradual and economical control of the motors.

One of the important results due to the employment of my invention, is that the rigid wheel base is reduced as compared with that required if all the power were developed in one locomotive unit, where all the motors act on a rigid wheel base.

Another particular feature is that when a plurality of locomotive units are employed according to my invention, the dimensions of the several voltage regulators are of course less than would be the case if only one were employed for the total power, and this enables me in the limiting case to apply a greater power to a train. Even if there be but one voltage regulator for two or more locomotive units I gain great advantage as to maximum traction where conditions are such as to tend to cause certain of the drivers to skid without the skidding of others by the fact that the motor armatures are in parallel and not in series, and there is also advantage as to maximum traction due to the fact that the motors have field windings which are separately excited. A certain power controllably divided between a plurality of units controlled by my invention also effects a greater flexibility in the application of the power to the load; increases the reliability of service by making a breakdown of one unit less important; enables me to reduce the investment necessary for spare units or apparatus; reduces the weight upon crossing bridge spans and similar instances by distributing the weight on drivers as required; makes it possible to operate at higher speeds on a certain roadbed; and makes it possible to operate on curves of shorter radius. In cases where turn-tables are employed, they may be comparatively small and the storage capacity of certain side tracks can be more advantageously employed at terminals and similar places, and the locomotive units may be more readily handled at the terminals.

Also the trains may be more easily broken up and assembled as the duty requires. The risk of derailment is reduced, and the wear and tear upon the roadbed is also reduced. Also the first cost and the cost of maintenance of the track is reduced compared with a system in which single locomotives are used of the aggregate power of my units.

In order that my invention may be better understood, attention is directed to the accompanying drawings forming part of this specification, and in which—

Figure 1 is a diagram illustrating two cars connected together to form a train, each being equipped with two operating motors and each being provided with corresponding controlling mechanism, the original source of power being illustrated as a 3-phase supply circuit with which collecting devices carried by the several cars make contact; Fig. 2 a corresponding view illustrating three cars mechanically connected to form a train, two of them being equipped with propelling motors, all of them with controlling rheostats, and one only with a source of power and of current for the operating motors; Fig. 3 a similar view illustrating the connections which may be employed when the current through the generator field or other device is to be controlled from several different points but not reversed, and in which case three wires only are necessary; Fig. 4 a corresponding view illustrating two connected cars, each equipped with two propelling motors, a dynamo electric generator, and an exciter of variable and reversible electromotive force, the original source of current being indicated as a 3-phase circuit, and wherein also only three wires between the cars are necessary; Fig. 5 a corresponding view showing two cars, the propelling motors of which are controlled by the counter electromotive force system described and claimed in my Patent No. 572,903, the original source of current being continuous; Fig. 6 a corresponding view showing a system substantially like that illustrated in Fig. 1 except that the exciter is driven by a separate small motor, in the present instance a 3-phase motor; and Fig. 7 is a diagram corresponding to the disclosures of Fig. 4, except that a single phase supply of energy is indicated.

Referring first to Fig. 1, two cars I, II are diagrammatically illustrated, the first being propelled by motors $M'$ $M'$, and the latter being propelled by motors $M^2$ $M^2$. The cars are mechanically connected to form a train, and are electrically connected for the control of the several motors, as will be explained. A train may obviously be composed of more than two cars. The source of current illustrated is a 3-phase circuit extending parallel to the track and with which collecting devices $T'$ and $T^2$ on the cars are in constant contact. If desired, the 3-phase circuit may be supplied with current from a feeding circuit F—C connecting either directly to the 3-phase circuit or by means of a step-down static transformer L. On each of the cars I illustrate motors $A'$ $A^2$ respectively, which may be 3-phase motors of the desired capacity and receive current either directly from the collecting devices $T'$ $T^2$ or through the intermediate static transformers $S'$ $S^2$. The armature shaft of the motor $A'$ drives a continuous current generator $G'$, and the armature shaft of the motor $A^2$ drives a continuous current generator $G^2$. The armatures of the motors $M'$ $M'$ are connected in parallel and receive current from the generator $G'$. The armatures of the motors $M^2$ $M^2$ are also connected in parallel and receive current from the generator $G^2$. Each of the cars is provided with four conducting wires 1, 2, 3, 4, which are adapted to be connected by suitable couplings with the corresponding wires of the adjacent cars, as shown. The fields of all the motors $M'$ $M'$ $M^2$ $M^2$ are connected across the wires 1, 2. The fields of the generators $G'$ $G^2$ are connected across the wires 3, 4. The armature of the motor $A'$ drives a small generator or exciter $E'$, while a corresponding generator or exciter $E^2$ is driven by the motor $A^2$. The armature $C'$ of the exciter $E'$ is connected across the wires 1, 2, and the armature $C^2$ of the exciter $E^2$ is connected across the same wires, whereby the circuit 1—2 will be supplied with a current of constant electromotive force from either exciter, feeding the fields of the several propelling motors.

$R'$ is a reversing rheostat on the first car, connected with the armature circuit of the exciter $E'$ and with the circuit 3—4, and by means of which, current supplied to the circuit 3—4 may be varied in amount or reversed in sense. A corresponding reversing rheostat $R^2$ is mounted on the second car and similarly connected between the armature of the exciter $E^2$ and the circuit 3—4. It will therefore be seen that the electromotive force supplied to the fields of the propelling motors is constant, and that the current supplied to the fields of the generators $G'$ $G^2$ is variable and reversible, whereby the propelling motors may be controlled in speed and direction. Thus, assuming both the motors $A'$ and $A^2$ to be operating, that the handle of the reversing rheostat $R^2$ occupies a neutral position, and that the brushes of the exciter $E^2$ are raised, so that no current will be supplied by that exciter: By properly manipulating the handle of the rheostat $R'$ the current supplied to the circuit 3—4, and consequently to the fields of the generators $G'$ and $G^2$, can be correspondingly increased or reduced or reversed, whereby the electromotive force, as well as the direction of current supplied by said generators to the armatures of the propelling motors, is under absolute control. In this way it is possible to secure any desired speed up to maximum in either direction of rotation of the motors $M'$ $M'$ and $M^2$ $M^2$, and if these motors are practically identical, they will at all times divide the load equally between them. It may sometimes be necessary to adjust the brushes or the field strength of the propelling motors in order that they may be made practically identical in capacity, but after such adjustment they will continue to divide the load equally, commercially speaking, even when the speed is varied greatly or when the direction is reversed. In Fig. 4, to which I shall presently refer, I illustrate small rheostats in the fields of the propelling motors, by which they may be adjusted in the first instance so as to divide the load proportionately or to compensate for any variation which may take place between them in use, as for example when the wheels driven by one motor may become worn and thereby become smaller in diameter.

If, instead of operating the reversing rheostat $R'$, its handle is set to the neutral position and the brushes of the exciter $E'$ are raised and those of the exciter $E^2$ are again engaged with its commutator, a manipulation of the reversing rheostat $R^2$ will effect a control of the electromotive force and direction of the current supplied by the exciter $E^2$ to the circuit 3—4 so as to simultaneously vary the strength or reverse the fields of the generators $G'$ and $G^2$, whereby the speed of the several propelling motors can be controlled simultaneously from the car $II$.

While I have illustrated and have referred to a 3-phase motor on each car for the purpose of driving the continuous current generator $G'$ or $G^2$, it will be obvious that in many cases any other motor, electric or mechanical, can be utilized for this purpose. When it is desired to stop the train or a single car equipped as explained, the operator (assuming the rheostat $R'$ to be in use) moves the operating handle thereof through the whole extent of its resistance until the handle reaches the neutral position, thereby resulting in a gradual reduction of the current in the circuit 3—4, effecting a gradual reduction of the fields of the generators $G'$ and $G^2$, and effecting a consequent reduction in the electromotive force supplied to the propelling motors. When the operating handle of the rheostat reaches its neutral position, no current will be supplied to the circuit 3—4 or by the generators $G'$ and $G^2$ to the propelling motors. Under these conditions of weakening the fields of $G'$ and $G^2$, if the electromotive force of $G'$ and $G^2$ falls below the electromotive force generated by the armatures of $M'$ and $M^2$, the propelling motors become generators and supply current to the generators $G'$ and $G^2$, which act as motors to drive the motors $A'$ $A^2$ as generators supplying current into the supply circuit, thereby reducing the energy required for the operation of other trains on the same line from the original source of power, and making it possible to stop the locomotive without mechanical brakes. To reverse the direction of movement, the operator moves the handle of the rheostat $R'$ or $R^2$, as the case may be, past the central or neutral position, thereby reversing the field magnetism of the generators $G'$ and $G^2$ simultaneously, and if the rheostat handle is further moved to cut out more or less of the resistance, the electromotive force of the generators will gradually and simultaneously increase up to the maximum in the reverse sense, thereby gradually increasing the speed of the propelling motors in the opposite direction.

In Fig. 2, I illustrate a train comprising three cars A, B, C, through all of which extend the circuit wires 1, 2 forming the constant electromotive force circuit, and the circuit wires 3, 4 forming the variable and reversible electromotive force circuit. The car C is illustrated as being furnished only with a single reversing rheostat $R^3$, by means of which current from the circuit 1—2 can be supplied to the circuit 3—4 varied in amount or reversed in sense, as will be understood. The car B is provided with a reversing rheostat $R^2$ similarly connected, but said car is shown also as being equipped with propelling motors $M^2$ $M^2$, the fields of which are connected in parallel with the circuit 1—2, and the armatures of which are connected in parallel with a circuit supplied from the generator $G'$ of the car A. The car A is provided with the same equipment as the cars shown in Fig. 1, except that the static transformer between the collecting devices $T'$ and the motor $A'$ is not illustrated. It will be seen that by manipulating either of the rheostats $R'$, $R^2$ or $R^3$, the operating handles of the other rheostats being maintained in a neutral position, the current supplied to the circuit 3—4 can be varied or reversed, thereby effecting a reduction in the field strength of the generator $G'$ or securing a reversal of that field to secure any desired variation in the electromotive force or direction of current supplied to the several propelling motors, whereby their speed will be simultaneously increased or diminished, while at all times they will maintain their proper proportion of the load. In this way the train as a whole can be effectively controlled from any one of the cars.

Referring to Fig. 3, I illustrate an arrangement of circuits whereby a translating device, illustrated diagrammatically as a magnet $d$, may be controlled from any one of a number of points A, B or C, which may correspond with the cars of Fig. 2. A generator G' driven from any source of power, as for example by a motor receiving current from a suitable trolley system, supplies current to wires $a$ and $c$, which are connected together from car to car. Arranged on each of the cars is a rheostat $e$ $e'$ $e^2$ respectively, connected between the wire $c$ and a wire $b$ extending parallel therewith and between which and the wire $a$ the translating device $d$ is connected in parallel. It will be seen that by operating either of the rheostats $e$, $e'$ or $e^2$, the others being open, the current supplied to the translating device can be increased or diminished at will to properly control the latter and any devices affected by it.

In Fig. 4, I illustrate means for controlling a plurality of motors or other electric translating devices, both as to their speed and as to the direction of rotation of their armatures or other movable elements, from any point on a curcuit of three wires. The controlling motor $a$ is of any suitable type, electric or mechanical, but for the purpose of illustration I have represented it as a 3-phase motor supplied by a circuit 4'—5'—6'. The motor $a$ drives the armature of a small shunt dynamo H, which supplies current to the field of a controlling continuous-current generator F through a reversing rheostat R', whereby the electromotive force and direction of current supplied by the exciter H to the field of the generator F may be varied or reversed, as may be desired. Thus, the armature of the generator F will be driven by the motor $a$ at a practically constant speed in a field whose strength can be varied and its polarity reversed at will. The current, therefore, supplied by the generator F to the circuit wires 2, 3 will be of a variable and reversible electromotive force. The car B is likewise provided with an operating motor $a'$ driving a shunt dynamo H', which supplies current to the field of a controlling continuous-current generator F' through a reversing rheostat R², as with the car A. G' G² represent two continuous current generators driven from any suitable source of power, electrical or mechanical, and which may be separated to any desired extent, one, for example, being mounted on one of the cars, A, constituting a train, and the other on another of such cars, B, assuming the invention to be utilized for the controlling of the propelling motors of a train composed of a series of motor cars. Thus, in Fig. 4, I illustrate the generator G' on the car A as being operated by a 3-phase motor A', and the generator G² on the car B as being operated by a 3-phase motor A², as in Fig. 1. The fields of the continuous current generators G' G² are connected in parallel with the circuit 2—3, whereby the strength of such fields can be simultaneously varied and their polarity simultaneously reversed at will to permit such generators to supply currents of corresponding electromotive force and direction at all times. The armature of the generator G' is connected by a series parallel switch K' with the armatures of the motors M' M', and the armature of the generator G² is connected by a series parallel switch K² with the armatures of the propelling motors M² M². The series parallel controlling switches K' and K² are of any common form, by means of which the armatures of the motors M' M' or M² M² may be connected in series or in parallel with each other. The fields of the motors M' and M² are connected in parallel with a circuit 1—2 supplied with current of constant electromotive force from the exciter H, as shown. In the field of each of the propelling motors M' M' or M² M² is preferably placed a small controlling rheostat $r$, by means of which each of the motors may be adjusted so as to always assume its proportionate share of the load, and by means of which the adjustment so effected can be varied when for any cause that is necessary, as for example when the wheels driven by that particular motor become worn and of reduced diameter. A controlling rheostat $r'$ may also be mounted in the common circuit leading to the fields of the two motors M' M' or M² M² for each locomotive, and by means of which both motors may simultaneously be varied when desired, in order that one locomotive as a unit may assume its desired or proportionate share of the load imposed on the train. A small rheostat $r^2$ in the field circuit of the exciter H is also employed for the purpose of controlling the electromotive force thereof.

In operation, assuming the motors $a$ $a'$ and generators G' G² to be rotating at the proper approximately constant speed, and the handle of each of the rheostats R' R² to be in its central or neutral position, current of constant electromotive force will be supplied, for example, by the exciter H to the circuit 1—2 to energize the fields of the propelling motors M' M², the brushes of the exciter H' being raised. No current will, however, energize the fields of the controlling generators F F', and in consequence no current will be generated in the circuit 2—3, so that the fields of the generators G' and G² will not be excited, said generators will generate no current, and the motors M' M² will therefore be at rest. By gradually moving the handle of the rheostat R' for example, current in one direction or the other will be permitted to energize the field of the controlling generator F with the desired polarity and with gradually increasing strength, whereby a current of gradually increasing electromotive force will be generated in the circuit 2—3. The strength of the fields of the generators G' and G² will be correspondingly increased, and a current of gradually increasing electromotive force will be generated by the generators G' and G² to supply the motors M' and M², which will start to operate at a gradually increasing speed. In this way, obviously, the speed of the motors M' and M² can be simultaneously controlled and the direction of their armatures reversed by either the rheostat R' or R², or by means of any other rheostat having the capacity of varying the electromotive force and the direction of current supplied to the circuit 2—3, it being understood that the rheostats which are not operating are maintained in their neutral position and that the adjacent exciting generators H, H', etc., are out of circuit. Obviously, by connecting to the circuits 1—2 and 2—3 a controlling apparatus comprising a motor $a$, an exciter H, a controlling generator F, and a rheostat R', as explained, the speed of the propelling motors can be simultaneously controlled and the direction of rotation of their armatures reversed from any other point on the circuit composed of the three wires 1, 2, 3.

Instead of varying the electromotive force of the controlling generator F by producing variations in the field strength thereof, it will of course be understood that the result can be secured in other ways familiar to those skilled in the art, as for example by varying the speed of rotation of the armature of the controlling generator or by reversing the sense of rotation thereof when a reversal of the polarity of the generators G' and G² is desired.

In Fig. 5, I illustrate the connections which may be used in two connected cars when the original source of current is unidirectional and of constant electromotive force, and wherein may be employed a counter electromotive force system (as I describe in my Patent No. 572,903) for controlling the several motors. 1'—2' represents a circuit of constant electromotive force and of continuous current, and 3', 3', 4', 4' collecting devices carried by the two cars. On the car A is a shunt machine $A^3$, its field and armature being connected across the collecting devices 3', 3', as shown. On the car B is a corresponding shunt machine $A^4$ similarly connected. The machine $A^3$ is mechanically connected with the armature of the dynamo electric machine $B^3$, and the machine $A^4$ is mechanically connected with the armature of the dynamo electric machine $B^4$. I have referred to these elements generally as "shunt machines" and "dynamo electric machines" because at some times they operate as motors and at other times they operate as generators. Preferably the armatures of the dynamos $A^3$ and $B^3$ and of $A^4$ and $B^4$ are mounted on the same shafts, as is common in the construction of motor generators. The armatures of the propelling motors M' and M² respectively are connected, as shown, in series with the armatures of the dynamos $A^3$, $B^3$ and $A^4$, $B^4$, so that each of said propelling motors will be connected in a local loop on its respective car. Connecting the cars are the wires 1, 2, 3, 4, as in Fig. 1, 1—2 being a circuit of constant electromotive force and 3—4 a circuit of variable and reversible electromotive force. The circuit 1—2 is supplied by connections $1^2$, $2^2$ from the source of supply, as shown, and each of the circuits $1^2$—$2^2$ is provided with a reversing rheostat RR therein, by means of which the current in the circuit 1—2 may be reversed in sense when it is desired to reverse the direction of rotation of the propelling motors M', M². The fields of said propelling motors are connected across the circuit 1—2 as shown, so that said fields will be at all times energized by a current of constant electromotive force. The circuit 3—4 is supplied from the source of supply by wires $3^2$, $4^2$ as shown, and in each of said circuits is a controlling rheostat R', R² as shown, by means of which the amount and the direction of the current supplied to the circuit 3—4 may be controlled. The operating handle of each of the rheostats R', R² is preferably arranged to be returned automatically by means of a spring or weight, as is common in the art, to the position in which the current supplied to the circuit 3—4 will energize the fields of the dynamo machines $B^3$ and $B^4$, whereby the electromotive force of such dynamos will be equal and opposite to the line electromotive force, so that in case of accident, the train will automatically come to rest. In each circuit $3^2$—$4^2$ is mounted a circuit breaker DB arranged to be manually opened or closed by the operator, while in circuit with the armature of each of the dynamo machines $A^3$, $A^4$ is a circuit breaker FDH of common form arranged to break the circuit when the supply voltage fails from any cause or when a current of objectionably high amperage influences the same. Shunting each of the automatic circuit breakers FDH is a resistance Res. In order to protect the dynamos $B^3$, $B^4$ and the motors M', M² from destructive currents, I also preferably place a circuit breaker DH in each of the local loops $A^3$—$B^3$—M' and $A^4$—$B^4$—M², whereby said circuit breakers will open said circuits when a destructively large current influences the same.

In operation, let it be supposed that from any cause there is no voltage on the line circuit 1'—2' and that the train is at rest: The circuit breakers FDH are all open, and the resistances Res. will therefore be in series with each of the shunt machines A³ and A⁴. The controllers R', R² have been moved by their automatic springs so that there is no resistance in series with the fields of the regulating machines B³, B⁴, and the connections are such that the electromotive force of A³, B³ and A⁴, B⁴ will be counter to each other in the loops A³—B³—M' and A⁴—B⁴—M². Assume now that the full electromotive force is impressed on the main circuit 1'—2': This excites the fields of the dynamos A³, B³, A⁴, B⁴ and of the motors M', M², and the current will also flow through the resistances Res. and the armatures of the dynamos A³, A⁴. The dynamos A³, A⁴, operating as motors, start into motion and accelerate both themselves and the dynamos B³, B⁴. Since the dynamos A³, B³, and A⁴, B⁴ are operating in full fields and are counter to each other in their respective loops, their full electromotive forces will be equal and opposite, and no current will flow through the armatures of the motors M' and M². Hence no power will be consumed in bringing the dynamos A³, B³ and A⁴, B⁴ up to their full speed, except the friction load. Assuming that the line voltage in the circuit 1'—2' is 550 volts, that the resistances Res. are each 2.5 ohms, and that 20 amperes are required to operate the dynamos A³, A⁴ after they have been accelerated; then 50 volts will be dropped upon each resistance, and the dynamos A³, B³ and A⁴, B⁴ will be producing nearly 500 volts. The operator now closes the circuit breaker FDH on the car from which the train is to be controlled, for example car A, cutting out the resistance and bringing up the dynamos A³, B³ to their full speed. There will still be no current of any consequence in the loop A³—B³—M'. The operator now closes the circuit breakers FDH successively on the other cars of the train until the dynamos on those cars are also brought up to full speed. He next sees that all the circuit breakers DB in series with the various controlling rheostats are open, except the one in series with the controlling rheostat which he intends to use. If he has been using a certain one and wishes to use another, he must first close the circuit breaker DB at the controlling rheostat he intends to use, and then open the corresponding circuit breaker at the controlling rheostat he is leaving, so that the fields of the dynamos B³, B⁴ will not be opened in the operation. It will be seen that if this were done, the dynamos B³ and B⁴ would not generate a counter electromotive force to the line, and hence the full unbalanced line electromotive force would influence the propelling motors M', M². To meet such a contingency as this, I have made use of the automatic circuit breakers DH, as explained. By now operating the handle of the controlling rheostat R', for example, on the car A, the fields of the dynamos B³ and B⁴ can be similarly and simultaneously weakened, as I describe in my said patent, thereby reducing the counter electromotive force generated by said dynamos and permitting current to flow through each of the local loops to correspondingly actuate the propelling motors. When the entire resistance of the controlling rheostat R' has been cut in, a further movement of the handle may actually break the circuit 3²—4², so that no current will influence the circuit 3—4, and the fields of the dynamos B³, B⁴ will hence be *nil*. The dynamos B³, B⁴ will therefore generate no counter electromotive force, and hence the full line voltage will be permitted to influence the propelling motors M', M². By now moving the handle of the controlling rheostat R' still farther, the direction of current in the circuit 3—4 will be reversed and will be gradually increased in amount. The dynamos B³, B⁴ will therefore act as boosters, adding their electromotive force to that of the line, so that when they are operating at their maximum duty, the voltage applied to the motors M', M² will be practically double that of the line voltage. When it is desired to reverse the direction of rotation of the propelling motors M', M², the result may be secured by operating the reversing rheostat RR when the electromotive forces of A³ and B³ are counter and approximately equal, which will reverse the current in the circuit 1—2 and thereby reverse the polarity of the motor fields. Instead of performing these operations, a rheostat may be placed in the field of each of the dynamos A³, A⁴, so that by weakening said fields, the electromotive force of the dynamos B³, B⁴ will exceed that of the dynamos A³, A⁴, causing current to flow in the opposite direction through the local loops to reverse the direction of rotation of the propelling motors.

Referring to Fig. 6, an arrangement closely analogous to that illustrated in Fig. 1 is shown, with the exception that the exciters E' and E² are driven from small independent motors IM and IM', in the present instance 3-phase motors. I also show the field of each of the exciters E' and E² as being controlled by a small rheostat r² corresponding to the controlling rheostat of the exciter H of Fig. 4. In other respects the construction and operation of the parts shown in this figure will be clear to those skilled in the art.

It will be noted that my invention is mainly directed to such method and apparatus as will permit the use of high pressure transmission and that an advantage of importance is the greater ease in collecting the small current by the moving contacts.

It is evident that in carrying my invention into practice, that the motors and other parts of the apparatus may be designed for such voltage and current as is most suitable for their practical operation, and it will be practicable and desirable in many instances to use different maximum voltages in the circuits of the two motor elements. Since the ohmic resistance in the local circuit containing the generator and motor armatures does not substantially affect the voltage supplied to the motor under change of current, the speed of the motors in a constant field will be practically proportionate to the net voltage in the local circuit and the current will automatically be in proportion to the torque. Hence the speed of the train will remain substantially constant without changing the controller in ascending a variable gradient. Similarly the rate at which the train will descend a variable gradient will be constant independent of a change of the controller, the current generation being automatically proportionate to the negative torque represented by the grade.

My method is applicable to any motors of the continuous current type and also in many cases to motors of other type. In using the term motors of continuous current type, I intend to include all electric motors having a commutator and in which under normal operation after starting, the working current in one element is commutated, whereby the motor is operative on direct, interrupted or alternating current.

In some instances the machines A and G need not necessarily be separate machines, since any known form of electric energy transformers may be employed, which will receive electric energy in any suitable form and deliver suitable electric energy of controllable electromotive force, instead of the separate machines. In some instances, instead of employing dynamo electric generators for exciting the fields of the propelling motors or for supplying other circuits used in the apparatus, other forms of current supply can be utilized, as for example primary or secondary batteries, thermo-electric generators, or magneto machines. It will furthermore be understood that other forms of generators and motors can be utilized from those shown, as for example the generators may be compound wound—that is, may have the customary series compounding coil in addition to the heretofore described field winding—and the motors may be series wound. Furthermore, it will be obvious that all known forms of series parallel control may be used in connection with the motor armatures. It will also be understood that instead of reversing the rotation of the motor armatures by reversing the current in the supplying generators therefor, the current supplied by the generators may be maintained in a constant direction and a reversing switch be interposed between the same and the motor armature for reversing the current in the latter, or the field of the motor may be reversed. It will also appear from my description that instead of operating the several controlling motors or the motors for driving the generators by electric energy, mechanical motors for the purpose may be utilized, and that instead of using a 3-phase current as explained, a single-phase or any other form of alternating current or electric current adapted to produce another by induction can be employed. For example, Fig. 7 illustrates a single phase stationary source of energy at 10, supplying through suitable connections the two conductors 11, 12 which in turn supply single phase energy to the cars as shown. The arrangement in other respects corresponds to the disclosures of Fig. 4.

In certain applications of my invention it may at times be desirable to operate the motors $M'$, $M'$ at different speeds from those of motors $M^2$, $M^2$, and it will be noted that the speed of the motors $M^2$, $M^2$, and vice versa, may be varied by means of the controlling devices $r'$, $r'$ which are adapted to effect any desired change of speed of the motor $M'$ relative to another motor $M^2$ while such motors are coupled upon a common load.

Where I refer in the following claims to transforming electrical energy, I mean to include methods of obtaining electrical energy having certain desired characteristics as to form of current or voltage, from electrical energy not having such characteristics provided that the energy delivered by the transforming means is delivered at a rate dependent upon the rate at which energy is delivered to the transforming means.

Whenever I refer in the claims hereof to one element of the motor as being affected, I do not necessarily mean that that element solely is affected.

Having now described my invention, what I claim as new and desire to secure by Letters Patent is as follows:—

1. The method of controlling a plurality of electrically operated vehicles in a train, which consists in generating alternating current energy, accelerating the vehicles thereby, generating alternating current energy to retard the vehicles, supplying said latter energy to a circuit, and controlling the current in a control circuit along the train for controlling said acceleration and retardation.

2. The method of simultaneously and similarly controlling the speed of two electric motors working upon a common load, which consists of generating in series with each of the motor armatures an independent and controllable electromotive force, and varying the voltage of each of said electromotive forces, while keeping the voltage of the two electromotive forces always practically equal to each other.

3. The method of simultaneously and similarly controlling the speed of a plurality of electric motors working in unison, which consists of developing in series with each of the motor armatures an independent electromotive force and changing and reversing the voltage of each of said electromotive forces, while keeping the voltage of the said electromotive forces always practically equal to each other.

4. The method of controlling a plurality of electrically operated vehicles in a train, which consists in accelerating the vehicles by energy taken from the supply circuit, generating energy by the movement of the train and restoring energy to the supply circuit to retard the vehicles, and controlling the current in a control circuit connecting the said different vehicles for controlling said acceleration and retardation.

5. The method of simultaneously and similarly controlling two electrically propelled vehicles in a train, which consists of generating an alternating current from a stationary source, leading the alternating current upon the train through moving contacts, transforming a part of such alternating current energy into unidirectional current, supplying the unidirectional current to one element of the several motors, and supplying to the other motor element electric energy independent of the said unidirectional energy.

6. The method of operating several electrically propelled vehicles in a train, which consists of generating current at a stationary source, leading upon the train energy represented by such current, transforming energy upon several different vehicles, supplying such transformed energy to one or more elements of the propelling motors, and simultaneously and similarly varying the electromotive force of the transformed energy.

7. The method of converting into electrical energy the power represented by a moving load, which consists in causing the moving load to produce uni-directional electrical energy, transforming such uni-directional energy into alternating electrical energy of practically constant electromotive force independent of the speed of the moving load, and supplying the alternating energy to a translating device.

8. The method of operating from a source of alternating current an electric motor at any desired speed from rest to the maximum, which consists in transforming such alternating currents into two independent unidirectional currents, supplying unidirectional currents to the two elements of the motor, and varying the electromotive force of one of the unidirectional currents.

9. The method of converting into electrical energy the power represented by retarding the moving load, which consists in causing the moving load to produce electrical energy of different electromotive forces, transforming said electrical energy into electrical energy of practically constant electromotive force, and supplying said transformed energy to an energy consuming circuit.

10. The method of simultaneously and similarly controlling the speed of two electric motors working in unison, which consists of developing in series with each of the motor armatures an independent electromotive force, and changing the voltage of each of said electromotive forces, while keeping the voltage of the two electromotive forces always practically fixed in their relative values.

11. The method of propelling and controlling a plurality of vehicles in a train, which consists in generating electrical energy dynamically upon a plurality of said vehicles, supplying said energy to one element of an electric motor, supplying energy to one point of control and controlling from said point the forward movement of the train by controlling the electromotive force of the energy supplied to said motor, and afterward supplying energy to another point of control and controlling from said other point the reverse movement of the train by controlling the electromotive force of the energy supplied to said motor.

12. The method of simultaneously and similarly controlling two electrically propelled vehicles in a train, which consists in generating an alternating current from a stationary source, leading the alternating current upon the train by means of moving contacts, transforming a part of said alternating current into unidirectional current, supplying the unidirectional current to one element of the motors and supplying to the other element of said motors electric energy independent of the said unidirectional energy.

13. The method of operating a plurality of electrically controlled vehicles in a train, which consists in generating electric energy at a stationary source, supplying energy to the train, transforming said energy upon the different vehicles, supplying such transformed energy to at least one element of the propelling motors, and simultaneously and similarly varying the electromotive force of the transformed energy.

14. The method of accelerating and retarding a movable vehicle which consists, while accelerating, in supplying to the vehicle alternating current energy at practically constant electromotive force, deriving therefrom electric energy at a variable electromotive force and varying the speed of the vehicle by varying said variable electromotive force supplied to at least one element of electric motors located on different vehicles of the train, and retarding said train by transforming the energy represented by the moving load into alternating current energy, and supplying such energy to an energy consuming circuit.

15. The method of operating a plurality of vehicles in a train, which consists in transmitting from a stationary source high pressure alternating current, leading such high pressure energy upon the train by means of moving contacts, deriving from such high pressure energy on the train electric energy at a lower and controllable electro-motive force, supplying the said low pressure energy to at least one element of the plurality of motors located on said different vehicles, and varying the electromotive force of said low pressure energy for the purpose of varying the speed of the motors.

16. The method of operating a plurality of vehicles in a train, which consists in transmitting from a stationary source high pressure alternating current electric energy, leading high pressure energy upon the train by means of moving contacts, deriving from such high pressure energy on the train electric energy of lower electromotive force, supplying energy to one point of control and controlling from said point the forward movement of the train by controlling the electromotive force of said low pressure energy for varying the speed and forward rotation of the motors, and afterward supplying energy to another point of control and controlling the reverse movement of the train from said other point by varying the electromotive force of said low pressure energy for varying the speed and reverse rotation of the motors.

17. The method of operating a plurality of vehicles in a train, which consists in transmitting from a stationary source high pressure alternating current electric energy, leading such high pressure energy upon the train by means of moving contacts, deriving from said high pressure energy upon the train electric energy of lower and controllable electromotive force, supplying to at least one element of a motor upon the train the said low pressure energy, varying the voltage to vary the speed of the motor, and retarding the train by causing the motor to act as a generator and deliver electric energy into the line.

18. The method of propelling and controlling a plurality of electrically operated vehicles in a train, which consists in generating electric energy upon a plurality of vehicles of the train, supplying said energy to one element of each propelling motor, supplying energy to one point of control and controlling from said point the forward movement of the train by controlling simultaneously the energy supplied to said motors by varying the electromotive force of the electric energy, and supplying energy to another point of control and controlling from said other point the reverse movement of the train by simultaneously controlling the electromotive force supplied to said motors.

19. The method of operating a plurality of vehicles in a train, which consists in transmitting high pressure energy from a stationary source, leading said energy upon the train, producing by magnetic induction in a local circuit upon the train, electrically insulated from the supply line, a controllable electromotive force, and varying the electromotive force in said local circuit for the purpose of varying the speed of the motors, and causing the motors to act as generators in said local circuit for the purpose of bringing the car to rest and reversing while continuously maintaining said circuit closed.

20. The method of operating a vehicle, which consists in generating single phase alternating current at relatively high pressure and small current at a stationary source, leading small current at high pressure through moving contacts upon the vehicle, deriving therefrom electrical energy at a reduced voltage, and supplying such energy to one element of the propelling motor, and supplying to the other element of the motor electric energy at an electromotive force different from that supplied to the first element of the motor.

21. The method of operating a vehicle, which consists in generating single phase alternating current at relatively high pressure and small current at a stationary source, leading said small current at high pressure through moving contacts upon the vehicle, deriving therefrom in two independent circuits electric energy at different electromotive forces, and energizing the two elements of the motor thereby.

22. The method of propelling one or more vehicles, which consists in generating alternating current energy at relatively high pressure and small current at a stationary source, leading said energy at high pressure through moving contacts upon the vehicle, deriving therefrom electric energy at low pressure and supplying the same to one element of the propelling motor, and also independently deriving electric energy at low pressure and supplying the same to another element of the propelling motor.

23. The method of propelling a plurality of vehicles by a plurality of electric motors, which consists in generating alternating current energy at relatively high pressure and small current at a stationary source, leading said energy at high pressure through moving contacts upon the vehicles, deriving therefrom electric energy at low pressure and supplying the same to one element of each of the propelling motors, and also independently deriving electric energy at low pressure and supplying the same to another element of each of the propelling motors, and simultaneously and similarly controlling the electromotive force of the energy supplied to one element of each of the motors.

24. The method of propelling a plurality of vehicles by a plurality of electric motors, which consists in generating alternating current energy at relatively high pressure and small current at a stationary source, leading energy at high pressure through moving contacts upon the vehicles, deriving therefrom electric energy at low pressure and supplying the same to one element of each of the propelling motors, and also deriving electric energy at low pressure and supplying the same to another element of each of the propelling motors, supplying energy to one point of control and controlling the forward movement of said vehicles from said point by simultaneously and similarly controlling the electromotive force of the energy supplied to one element of each of the motors, and afterward supplying energy to another point of control and controlling the reverse movement of said vehicles from said other point by simultaneously and similarly controlling the electromotive force of the energy supplied to one element of each of the motors.

25. The method of converting into electrical energy the power represented by a moving train comprising a plurality of vehicles each of said vehicles having a propelling motor which consists in causing the motors to simultaneously generate electric energy at varying speeds of the motors, transforming such energy and controlling the electromotive force of such transformed energy, and delivering the transformed energy to an energy consuming circuit.

26. The method of operating a plurality of electrically propelled vehicles, which consists in generating electric energy at a stationary source, leading energy upon the vehicles, transforming electric energy on the different vehicles, and simultaneously and similarly controlling the electromotive force of said derived energy on the vehicles for varying the electromotive force utilized in at least one element of the motor.

27. The method of operating a plurality of electrically propelled vehicles, which consists in generating electric energy at a stationary source, leading energy upon the vehicles, transforming the electric energy on the different vehicles, supplying energy to one point of control and controlling the forward movement of said vehicles from said point by controlling the electromotive force of the energy supplied to one element of the propelling motor, and afterward supplying energy to another point of control and from said other point controlling the reverse movement of said vehicle by controlling a reversed electromotive force supplied to one element of the motor.

28. The method of operating a plurality of electrically propelled vehicles, which consists in generating electric energy at a stationary source, leading energy upon the vehicles, transforming the electric energy on the different vehicles, supplying such transformed energy to a plurality of electric motors, and simultaneously and similarly controlling the electromotive force of said transformed energy on the vehicles for varying the electromotive force applied to the said motors.

29. The method of operating an electric motor, which consists in generating high tension single phase energy, transforming such energy into energy of lower electromotive force and larger current, supplying such energy of lower electromotive force through a revolving commutator to at least one element of the motor, supplying energy to one point of control and controlling from said point the rotation of the motor in one direction by controlling the electromotive force supplied to said element, supplying energy to another point of control and controlling the rotation of the motor in the opposite direction from said other point by controlling the electromotive force of the energy supplied to said motor.

30. The method of operating an electric motor, which consists in generating high tension single phase energy, transforming such energy into energy of lower electromotive force and larger electric current, supplying such energy of lower electromotive force to at least one element of the motor, commutating the current so supplied, supplying energy to one point of control and controlling from said point the speed of rotation of the motor in one direction by controlling the electromotive force supplied to said element, retarding the motor by causing it to generate electric energy, supplying energy to another point of control and controlling from said other point the speed of rotation of the motor in the opposite direction by controlling the electromotive force supplied to said element, and retarding the motor by causing it to generate electric energy.

31. The method of operating an electric motor, which consists in supplying energy to at least one element of the motor, commutating the current so supplied, supplying energy to one point of control and controlling from said point the speed of rotation of the motor in one direction by controlling the electromotive force of the energy supplied to said motor, and afterward supplying energy to another point of control and controlling from said other point the speed of the motor in the opposite direction by controlling the electromotive force of the energy supplied to the motor.

32. The method of operating an electric motor at varying speeds, which consists in supplying its armature from a generator, exciting the field of the generator from a separate source of electromotive force and varying the electromotive force of said separate source.

33. The method of operating an electric motor, which consists in supplying its armature from a generator, exciting the field of the generator from a separate source, and varying and reversing the electromotive force of said separate source.

34. The method of operating an electrically propelled train comprising one or more vehicles, which consists in generating high tension single phase energy, conducting high tension single phase energy upon the train, transforming on the train such energy into energy of sufficiently low tension to be readily commutated, dividing said energy into a plurality of divisions, supplying each of said divisions of low tension energy to at least one element of its respective electric motor, commutating the current of each division, and varying the speed of the train by varying the net effective electromotive force of the said low tension energy.

35. The method of operating an electrically propelled vehicle, which consists in generating single phase alternating electric energy at a stationary source, transmitting such energy in the form of high tension single phase energy, leading single phase energy upon the vehicle through moving contacts, transforming on the vehicle single phase energy into low tension energy, supplying such low tension energy to at least one element of the propelling electric motors, commutating the current of said low tension energy, and varying the speed of said motors by varying the net effective electromotive force of said low tension energy.

36. The method of retarding an electrically propelled vehicle, which consists in generating in the revolving windings of a plurality of dynamo electric machines, each mechanically connected to its respective axle, low tension electric energy, commutating the current so generated by each dynamo electric machine, transforming the energy into energy having high tension single phase alternating current, then conducting the high tension single phase energy through moving contacts to a high tension single phase supply circuit, and utilizing the said energy in said circuit.

37. The method of operating an electrically propelled vehicle, which consists in generating at a stationary source alternating current energy, transmitting the energy derived from said source to the vehicle in the form of high tension alternating current energy, conducting high tension energy upon the vehicle through moving contacts, transforming such energy on the vehicle into low tension energy, supplying low tension energy to a plurality of motors which divide the total load between them, and varying the speed of the vehicle by varying the effective electromotive force of the energy supplied to said motors.

38. The method of operating an electrically propelled train, which consists in generating at a stationary source alternating current energy, transmitting the energy derived from the said source to the train in the form of high tension alternating current energy, conducting high tension energy upon the train through moving contacts, transforming such energy on the train into low tension energy, supplying low tension energy to a plurality of motors which divide the total load between them, varying the speed of the train by varying the effective electromotive force of the energy supplied to said motors, and retarding the train by causing said motors to act as generators in unison.

39. The method of controlling an electrically propelled train comprising a plurality of vehicles, which consists in producing on one of the vehicles an electromotive force for producing a current in a controlling circuit, transmitting current in said circuit to another of the vehicles, and controlling from said other vehicle the current in said circuit and thereby control the movement of the train.

40. The method of controlling an electrically propelled train, comprising a plurality of vehicles, which consists in producing on one of the vehicles electric energy for propelling the train, supplying a current to a controlling circuit on one of the vehicles, transmitting current in said circuit to another of the vehicles, controlling from said other vehicle the current in said circuit and thereby controlling the said electric energy for propelling the train.

41. The method of operating an electrically propelled train, which consists in leading alternating current electric energy of substantially constant electromotive force upon the train through moving contacts, transforming said energy into energy of different electromotive forces for operating the train at different speeds, producing on the train an electromotive force which is independent of said other electromotive forces, and controlling a current due to said independent electromotive force for controlling said different electromotive forces and thereby controlling the speed of the train.

42. The method of operating an electrically propelled train, which consists in leading single phase high tension alternating current electric energy of substantially constant electromotive force upon the train through moving contacts, transforming said energy on the train into energy of unidirectional current, producing on the train an electromotive force which is independent of said other electromotive forces, and controlling a current due to said independent electromotive force for varying the electromotive forces of said unidirectional energy and thereby controlling the speed of the train.

43. The method of operating a plurality of vehicles in a train, which consists in transmitting high pressure energy from a stationary source, leading energy upon the train, producing in a local circuit upon the train a controllable electromotive force, and varying the electromotive force in said local circuit for the purpose of varying the speed of the motors, and causing the motors to act as generators in said local circuit for the purpose of bringing the train to rest and reversing while continuously maintaining said circuit closed.

44. The method of operating a vehicle, which consists in generating electric energy at relatively high pressure and small current at a stationary source, leading high pressure energy through moving contacts upon the vehicle, deriving therefrom electrical energy at a reduced voltage, and supplying such energy to one element of the propelling motor, and supplying to another element of the motor electric energy at an electromotive force different from that supplied to the first element of the motor.

45. The method of operating a vehicle, which consists in generating current at relatively high pressure and small current at a stationary source, leading small current at high pressure through moving contacts upon the vehicle, deriving therefrom in two independent circuits electric energy at different electromotive forces, and energizing the two elements of the motor thereby.

46. The method of propelling a plurality of vehicles by a plurality of electric motors, which consists in generating alternating current energy at relatively high pressure and small current at a stationary source, leading energy at high pressure through moving contacts upon the vehicles, deriving therefrom electric energy at low pressure and supplying the same to one element of each of the propelling motors, and also independently deriving electric energy at low pressure and supplying the same to another element of each of the propelling motors, controlling the forward movement of said vehicles by simultaneously and similarly controlling the electromotive force of the energy supplied to one element of each of the motors, and controlling the reverse movement of the vehicles by simultaneously and similarly controlling the electromotive force of the energy supplied to one element of each of the motors.

47. The method of train control which consists in developing a separate electromotive force upon each of a plurality of locomotive units in a train, and varying simultaneously the voltage applied to at least one element of the propelling motors of each of said units by simultaneously varying each of said electromotive forces.

48. The method of operating a train, which consists in generating electric energy at a stationary source, transmitting electric energy to the train, leading electric energy upon the train by means of moving contacts, transforming the energy into a plurality of divisions on different locomotive units of the train, supplying said divisions of the energy to at least one element of the motors of the respective locomotive units, and simultaneously controlling the transformed energy to control the train.

49. The method of controlling a plurality of motors acting on a common load, which consists in simultaneously controlling a plurality of inductively acting voltage regulators in series with each of the motors respectively.

50. The method of controlling a plurality of motors acting on a common load, which consists in controlling the energy in a control circuit, and thereby controlling a plurality of electromotive forces in series with each of the motors respectively.

51. The method of controlling a plurality of motors acting on a common load, which consists in dividing the energy into a plurality of divisions, varying the electromotive force of the divisions, and supplying the resultant energy of variable electromotive force of each division to its corresponding motor.

52. The method of operating a train which consists in developing a separate electromotive force upon each of a plurality of locomotive units in a train, and controlling the power at various speeds by simultaneously varying each of said electromotive forces in series with the propelling motors of each of said units.

53. The method of operating a train which consists in generating energy at a stationary source, leading energy on the train by moving contacts, creating on the train a plurality of electromotive forces, each of said electromotive forces being variable, supplying at least one element of the propelling motors from each of said sources respectively, and simultaneously varying the speed of the motors by simultaneously varying the electromotive forces applied to corresponding elements of the motors.

54. The method of reversing an electric motor, which consists in supplying its armature from a generator, supplying the field of the generator from a separate source of electromotive force, and reversing the direction of the electromotive force of said separate source.

55. The method of controlling a plurality of electrically propelled vehicles in a train, which consists in generating alternating current energy, accelerating the vehicles by energy derived therefrom, generating alternating current energy to retard the vehicles and supplying said latter energy to a circuit, transmitting control energy along the train, and controlling said control energy for controlling said acceleration and retardation.

56. The method of controlling a plurality of electrically propelled vehicles in a train, which consists in generating alternating current energy, accelerating the vehicles by energy derived therefrom, generating alternating current energy to retard the vehicles and supplying said latter energy to a circuit, transmitting electric control energy along the train and controlling said electric control energy for controlling said acceleration and retardation.

57. The method of controlling a plurality of electrically propelled vehicles in a train, which consists in generating alternating current energy, accelerating the vehicles thereby, generating alternating current energy to retard the vehicles, supplying said latter energy to a circuit, and controlling the current in a lower tension control circuit along the train for controlling said acceleration and retardation.

58. The method of controlling a plurality of electrically operated vehicles in a train, which consists in generating alternating current energy, accelerating the vehicles thereby, generating alternating current energy to retard the vehicles, supplying said latter energy to a circuit, and controlling unidirectional current in a control circuit along the train for controlling said acceleration and retardation.

59. The method of controlling a plurality of electrically operated vehicles in a train, which consists in accelerating the vehicles by energy taken from the supply circuit, generating energy by the movement of the train and restoring energy to the supply circuit to retard the vehicles, transmitting control energy along the train, and controlling said control energy for controlling said acceleration and retardation.

60. The method of controlling a plurality of electrically operated vehicles in a train, which consists in generating alternating current energy, accelerating the vehicles thereby, generating alternating current energy to retard the vehicles, supplying said latter energy to a circuit, supplying current to the control circuit along the train from a separate source of electromotive force on the train, and controlling the current in said control circuit along the train for controlling said acceleration and retardation.

61. The method of operating a motor at different speeds, which consists in supplying its armature from a dynamo electric generator, supplying its field winding and the field winding of said generator from two sources of electromotive force respectively, and developing different voltages at the source of supply for the generator field winding.

62. The method of operating an electric motor at different speeds, which consists in supplying its armature from a dynamo electric generator, supplying its field winding and the field winding of said generator from two sources of electromotive force respectively, and varying and reversing the electromotive force of one of said sources.

63. The method of operating an electric motor at different speeds, which consists in supplying its armature from a dynamo electric generator, supplying its field winding and the field winding of said generator from two sources of electromotive force respectively, and reversing the direction of the electromotive force of that source from which the field of the generator is energized.

64. The method of operating an electric motor at different speeds, which consists in supplying its armature from a dynamo electric generator, supplying a field winding of the motor and a field winding of said generator from two sources of electromotive force respectively, and developing different electromotive forces in the circuit of the generator field winding.

65. The method of operating a motor from rest to a high speed, which consists in supplying its armature from a generator, exciting the field of the generator from a separate source of electromotive force, energizing a field winding of the motor from a separate source of electromotive force, and varying the effective electromotive force in the circuit of said generator field winding from substantially zero to a maximum electromotive force.

66. The method of controlling an electric motor, which consists in supplying it from a generator, energizing the field of the generator from a separate source of current, varying the voltages of said generator and said separate source, and reversing the current supplied to the generator field magnet from the separate source of current for reversing the motor.

67. The method of operating an electric motor at different speeds, which consists in generating electric energy at a variable and controllable electromotive force, supplying said energy to a controlling circuit and to a plurality of electromagnetic controlling windings, varying the said electromotive force independently of said windings to vary the magnetic effect of said windings, and controlling thereby the energy supplied to at least one of the elemental windings of the motor.

68. The method of operating a motor at different speeds, which consists in generating different electromotive forces in a controlling circuit and thereby varying the effect of electromagnetic windings, and thereby varying the electromotive force of the energy delivered to the motor.

69. The method of operating a motor at different speeds, which consists in generating different electromotive forces in a control circuit, controlling thereby the electromotive force of a source of electromotive force, and supplying the energy from said source at different electromotive forces to at least one of the motor windings.

70. The method of electrically controlling a train comprising a plurality of locomotive units, which consists in developing electric energy upon each of a plurality of the locomotive units, dividing the total duty of each of said locomotives between a plurality of motor armatures, and varying the voltage of the energy supplied to each of the motors by varying control energy supplied to the said plurality of units.

71. The method of accelerating a train which consists in generating high tension electric energy at a stationary source, transforming said energy to energy of lower electromotive force and supplying said transformed energy to a working conductor, conducting said transformed energy from the working conductor upon the train, transforming the energy upon the train into a plurality of divisions, and supplying energy from said divisions at gradually increasing electromotive forces to a plurality of electric motor windings connected in parallel with each other on each of a plurality of locomotives in the train.

72. The method of electrically operating a train, which consists in causing the development by magnetic induction of a plurality of different electromotive forces successively upon each of a plurality of units in said train, supplying energy dependent upon said different electromotive forces upon each such unit to a plurality of propelling motors, and employing common control energy upon said units to simultaneously control said energy and thereby control the propulsion of the train.

73. The method of electric locomotive control which consists in deriving electric energy from a common source of electromotive force on the train, supplying energy from said source on the train to a plurality of motor armature windings connected in parallel relatively to said source, and separately exciting the field windings of said motors corresponding to said armature windings.

74. The method of electric locomotive control, which consists in inductively developing electric energy upon the locomotive, supplying said energy at the voltage at which it is developed to each of the armature windings of a plurality of electric motors working on a common load; separately exciting said motors, and varying the electromotive force of the energy developed on the locomotive to cause the joint action of the motors to start the locomotive, whereby the tractive effort of each motor is substantially independent of another motor.

75. The method of operating a train which consists in generating electric energy at a stationary source, conducting electric energy in a plurality of divisions through a plurality of moving contacts upon the train, transforming each of said divisions of the energy on the train, controlling by a common control the several divisions of the energy, supplying the controlled divisions of energy to corresponding tractive electric motors, and simultaneously varying the voltage of the several divisional energies to vary the speed of the train.

76. The method of starting a vehicle from rest which consists in producing electric energy on the vehicle, supplying energy to a plurality of motor armature windings connected to produce torques independent of each other, separately exciting a field winding corresponding to each of said armatures, and varying the electromotive force of the energy supplied to the armatures whereby the tractive effort produced by each motor is produced independently of a change in the tractive effort produced by another motor.

77. The method of starting an electrically propelled train from rest which consists in generating electric energy at a stationary source, conducting energy upon the train, transforming energy upon the train and supplying energy at the transformed voltage to the armature windings of each of a plurality of propelling motors while at rest, and separately exciting corresponding field windings of said motors.

78. The method of operating an electrically propelled train, which consists in generating electric energy at a stationary source, conducting energy upon the train, transforming energy upon the train by magnetic induction, and supplying such transformed energy to a plurality of electric motor windings in series with each other and supplying such transformed energy to said windings in parallel with each other.

79. The method of operating an electrically propelled train which consists in generating electric energy at a stationary source, conducting energy upon the train, transforming energy upon the train by magnetic induction, supplying such transformed energy to a plurality of motor armature windings in series and in parallel with each other, and separately exciting the field windings of the motors respectively.

80. The method of operating an electrically propelled train which consists in generating electric energy at a stationary source, conducting energy upon the train, transforming energy upon the train by magnetic induction, accelerating the train by passing current derived from said transformed energy through a plurality of electric motor windings first in series and then in parallel, and retarding the train by causing said motor windings to generate a braking current.

81. The method of operating an electrically propelled train which consists in generating alternating current at a stationary source, conducting alternating current upon the train, deriving unidirectional current on the train by transformation of energy, and supplying unidirectional current to a plurality of electric motor windings in series and then in parallel.

82. The method of multiple unit train control which consists in generating energy at a stationary source, leading energy upon the train, supplying propelling energy derived therefrom to a plurality of propelling motors located upon different units of the train respectively, transmitting control energy between the said units of the train, and controlling said control energy to simultaneously control the propulsion of the said units of the train.

83. The method of train control which consists in generating electric energy at a stationary source, conducting energy upon the train, transforming energy upon the train, supplying said transformed energy to a plurality of motors upon each of a plurality of locomotive units of the train and thereby developing a plurality of tractive torques upon each of the said units, transmitting control energy between the units, and controlling said control energy to control the transformed energy and thereby control the joint action of the locomotive units.

84. The method of operating a plurality of motors mechanically connected to drive a common load which consists in connecting the motor armatures in series and in parallel, impressing independent voltages on the armature terminals of the several motors, and simultaneously varying the amounts of said voltages.

85. The method of train control which consists in transmitting control energy along the train in a certain direction to cause the movement of the train in a certain direction and reversing the direction of the energy through the source of said energy and the flow of such control energy to reverse the direction of movement of the train.

86. The method of multiple unit train control which consists in transmitting control energy along the train, said energy having a variable factor, and varying the value of said factor of the control energy upon each of the units to vary the speed of the train.

87. The method of multiple unit train control which consists in transmitting control energy along the train, said energy having a variable factor, varying the value of said factor of the control energy upon each of the units to vary the speed of the train, and reversing the energy flow to reverse the movement of the train.

88. The method of controlling a plurality of electric motors working upon a common load, which consists in separately exciting the fields of said motors, passing a current through the motor armatures in series, and reversing the electromotive force impressed upon the armature circuit of said motors for reversing the direction of rotation.

This specification signed and witnessed this 29th day of April 1901.

HARRY WARD LEONARD.

Witnesses:
  Frank L. Dyer,
  Jno. R. Taylor.